US012804388B2

(12) United States Patent
Hong

(10) Patent No.: US 12,804,388 B2
(45) Date of Patent: Nov. 17, 2026

(54) INFORMATION TRANSMITTING METHOD AND DEVICE, COMMUNICATION APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 278 days.

(21) Appl. No.: 18/705,462

(22) PCT Filed: Oct. 29, 2021

(86) PCT No.: PCT/CN2021/127588
§ 371 (c)(1),
(2) Date: Apr. 26, 2024

(87) PCT Pub. No.: WO2023/070560
PCT Pub. Date: May 4, 2023

(65) Prior Publication Data
US 2025/0240620 A1 Jul. 24, 2025

(51) Int. Cl.
*H04L 65/00* (2022.01)
*H04W 12/03* (2021.01)
*H04W 76/20* (2018.01)
*H04W 92/18* (2009.01)

(52) U.S. Cl.
CPC ........... *H04W 12/03* (2021.01); *H04W 76/20* (2018.02); *H04W 92/18* (2013.01)

(58) Field of Classification Search
CPC ..... H04W 12/03; H04W 76/20; H04W 92/18; H04W 12/08; H04W 88/04; H04W 12/37; H04L 63/20
USPC .......................................................... 455/410
See application file for complete search history.

(56) References Cited

U.S. PATENT DOCUMENTS

2023/0239686 A1* 7/2023 Li ...................... H04W 12/033
726/1

FOREIGN PATENT DOCUMENTS

CN 112351431 A 2/2021
WO WO 2021201857 A1 10/2021

OTHER PUBLICATIONS

Solution for security policies handling in relay communication, 3GPP TSG-SA Meeting # 10bis-E, Samsung, Oct. 12-16, 2020 (Year: 2020).*
PCT/CN2021/127588, International Search Report dated Jun. 24, 2022, 2 pages.
Xiaomi "Summary of offline 110—Identification and access restriction" 3GPP TSG-SA3 Meeting #102Bis-e,S3-211106, Mar. 2021, 2 pages.

(Continued)

*Primary Examiner* — Tanmay K Shah
(74) *Attorney, Agent, or Firm* — Cozen O'Connor

(57) ABSTRACT

An information transmitting method performable by user equipment (UE) includes: obtaining a PC5 security policy by the UE, in which the PC5 security policy is configured to protect PC5 communication between relay UE and remote UE. An information transmitting method performable by a core network includes: configuring a PC5 security policy, wherein the PC5 security policy is configured to protect PC5 communication between relay UE and remote UE.

14 Claims, 4 Drawing Sheets

(56) References Cited

OTHER PUBLICATIONS

Samsung "Solution for security policies handling in relay communication" 3GPP TSG-SA3 Meeting #100bis-e, S3-202614, Oct. 2020, 2 pages.
Samsung "Solution for handling security policy misalignment over ProSe L3 UE2NW relay" 3GPP TSG-SA3 Meeting #1-1e, S3-202380, Oct. 2020, 3 pages.
3GPP TR 33.847 Technical Specification Group Services and System Aspects; Study on security aspects of enhancement for proximity based services in the 5G System (5GS) (Release 17) Oct. 2021; 157 pages.
European Patent Application No. 21961915.2, Search and Opinion dated Oct. 28, 2024, 8 pages.

* cited by examiner

INFORMATION TRANSMITTING METHOD AND DEVICE, COMMUNICATION APPARATUS, AND STORAGE MEDIUM

CROSS-REFERENCE TO RELATED APPLICATION

This application is a U.S. national stage application of International Application No. PCT/CN2021/127588, filed on Oct. 29, 2021, the entire content of which is incorporated herein by reference.

FIELD

The present disclosure relates to but is not limited to the field of wireless communication technology, and more particularly, to an information transmitting method, an information transmitting device, a communication apparatus, and a storage medium.

BACKGROUND

For the fifth Generation (5G, $5^{th}$ Generation) cellular mobile communication, Proximity Service (ProSe) includes: ProSe direct communication and ProSe indirect communication. Remote user equipment (UE) achieves communication with a network through UE-to-network (U2N) relay UE in a scenario of the ProSe indirect communication.

SUMMARY

According to a first aspect of embodiments of the present disclosure, there is provided an information transmitting method performable by user equipment (UE). The information transmitting method includes: obtaining a PC5 security policy, in which the PC5 security policy is configured to protect PC5 communication between relay UE and remote UE.

According to a second aspect of embodiments of the present disclosure, there is provided an information transmitting method performable by a core network. The information transmitting method includes: configuring a PC5 security policy, in which the PC5 security policy is configured to protect PC5 communication between relay UE and remote UE.

According to a third aspect of embodiments of the present disclosure, there is provided a communication apparatus, including a processor, a memory, and an executable program that is stored in the memory and runnable by the processor, in which when running the executable program, the processor obtains a PC5 security policy, in which the PC5 security policy is configured to protect PC5 communication between relay UE and remote UE.

BRIEF DESCRIPTION OF DRAWINGS

The accompanying drawings, which are incorporated in and constitute a part of this specification, illustrate embodiments consistent with the disclosure and together with the description, serve to explain the principles of the disclosure.

DETAILED DESCRIPTION

Embodiments of the present disclosure are described in detail below, and examples of the embodiments are shown in accompanying drawings. In the description with reference to the drawings, unless otherwise indicated, the same numbers in different drawings indicate the same or similar elements. The embodiments described below do not represent all embodiments consistent with the present disclosure. Instead, they are only examples of devices and methods consistent with some aspects of the present disclosure as detailed in the attached claims.

Terms used in the embodiments of the present disclosure are solely for the purpose of describing specific embodiments and are not intended to limit the embodiments of the present disclosure. The singular forms of "one", "said", and "the" used in embodiments of the present disclosure and the attached claims are also intended to include plural forms, unless clearly indicated otherwise in the context. It should also be understood that the term "and/or" used in this context refers to and includes any or all possible combinations of one or more related listed items.

It should be understood that although terms, such as "first," "second," and "third," may be used to describe various information in the embodiments of the present disclosure, these information should not be limited to these terms. These terms are only used to distinguish information of the same type from each other. For example, without departing from the scope of embodiments of the present disclosure, first system information may also be called second system information, and similarly, the second system information may also be called the first system information. Depending on the context, the term "if" may be construed to mean "when" or "upon" or "in response to determining".

Figure 1:
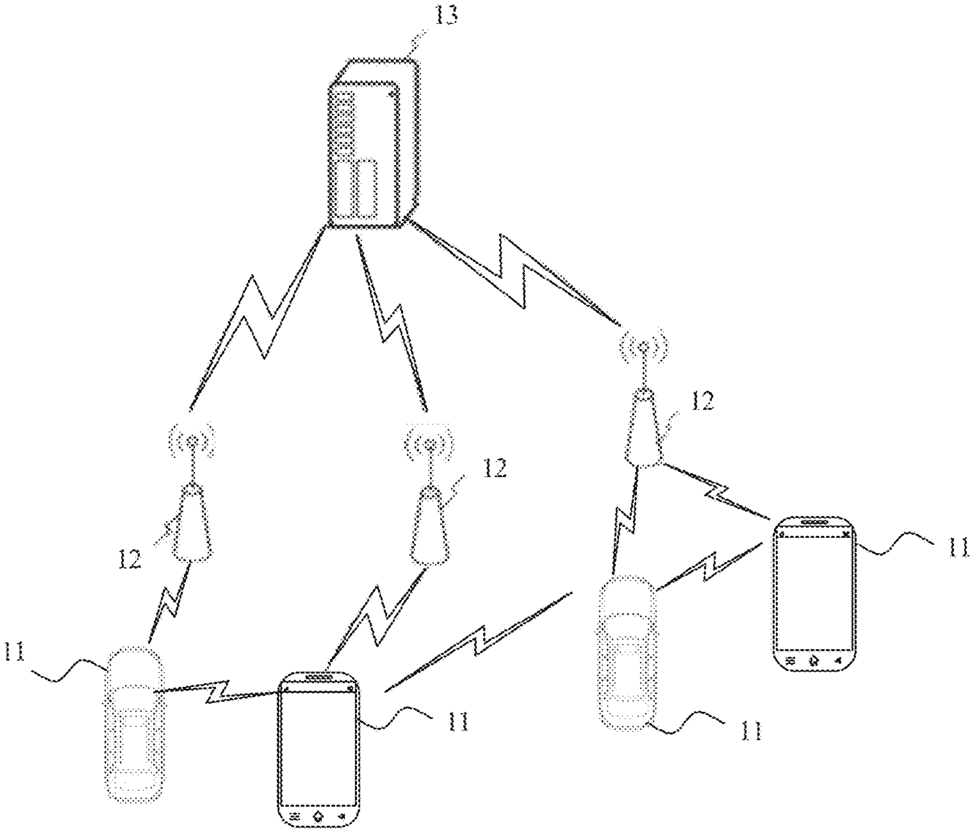
FIG. 1 is a schematic diagram of a wireless communication system according to an embodiment of the present disclosure.

FIG. 1 shows a schematic diagram of a wireless communication system according to embodiments of the present disclosure. As shown in FIG. 1, the wireless communication system is a communication system based on cellular mobile communication technology, and the wireless communication system includes: a plurality of terminals 11 and a plurality of base stations 12.

The terminal 11 is an apparatus that provides voice and/or data connectivity to a user. The terminal 11 can communicate with one or more core networks through a radio access network (RAN). The terminal 11 can be an Internet of Things terminal, such as a sensor device and a mobile phone (or called a "cellular" phone), or can be a computer with the Internet of Things terminal, for example, a fixed, a portable, a pocket-sized, a handheld, a computer-integrated, or a vehicle-mounted device, such as a station (STA), a subscriber unit, a subscriber stations, a mobile station, a mobile, a remote station, an access point, a remote terminal, an access terminal, a user terminals, a user agent, a user device, or user equipment (UE). Alternatively, the terminal 11 can also be an apparatus for an unmanned aerial vehicle. Alternatively, the terminal 11 can also be a vehicle-mounted device, such as a vehicle-mounted computer with a wireless communication function, or a wireless communication device connected to an external vehicle-mounted computer. Alternatively, the terminal 11 can also be a roadside device, such as a street light, a signal light, or other roadside devices with the wireless communication function.

The base station 12 is a network-side apparatus in the wireless communication system. The wireless communication system can be a fourth generation (4G) mobile communication system, also called a long term evolution (LTE) system. Alternatively, the wireless communication system can also be a 5G system, also called a new radio (NR) system or a 5G NR system. Alternatively, the wireless communication system can also be a next generation system of the 5G system. An access network in the 5G system can be called a new generation-radio access network (NG-RAN). Alternatively, the wireless communication system can also be a machine type communication (MTC) system.

The base station 12 can be an evolutional base station (eNB) used in the 4G system. Alternatively, the base station 12 can also be a base station (gNB) with a centralized distributed architecture used in the 5G system. When adopting the centralized distributed architecture, the base station 12 usually includes a central unit (CU) and at least two distributed units (DU). The central unit is provided with a protocol stack consisting of a packet data convergence protocol (PDCP) layer, a radio link control (RLC) layer and a media access control (MAC) layer. The distributed unit is provided with a protocol stack of a physical (PHY) layer. The specific implementation of the base station 12 is not limited in the embodiments of the present disclosure.

A wireless connection can be established between the base station 12 and the terminal 11 through a wireless air interface. In different implementations, the wireless air interface is a wireless air interface based on a standard of the fourth generation (4G) mobile communication network technology standard. Alternatively, the wireless air interface is a wireless air interface based on a standard of the fifth generation (5G) mobile communication network technology, such as a new radio. Alternatively, the wireless air interface can also be a wireless air interface based on a standard of a next-generation mobile communication network technology of the 5G.

In some embodiments, an E2E (End to End) connection can also be established between the terminals 11. There are scenarios, such as V2V (vehicle to vehicle) communication, V2I (vehicle to infrastructure) communication, and V2P (vehicle to pedestrian) communication in vehicle to everything (V2X) communication.

In some embodiments, the wireless communication system can also include a network management apparatus 13.

The plurality of base stations 12 are individually connected to the network management apparatus 13. The network management apparatus 13 can be a core network apparatus in the wireless communication system. For example, the network management apparatus 13 can be a mobility management entity (MME) in an evolved packet core (EPC). Alternatively, the network management apparatus can also be other core network apparatuses, such as a service gateway (SGW), a public data network gateway (PGW), a policy and charging rules function (PCRF) unit, or a home subscription server (HSS). The implementation of the network management apparatus 13 is not limited in the embodiments of the present disclosure.

An executing entity involved in the embodiments of the present disclosure includes but is not limited to: UE (e.g., a mobile terminal) that supports the cellular mobile communication, a base station, and a core network.

In a scenario of the ProSe indirect communication, PC5 communication based on a PC5 connection needs to be established between remote UE and U2N relay UE. PC5 connection security in the ProSe indirect communication is mainly achieved by generating a key. How to configure activation and deactivation of the PC5 connection security to meet a communication security requirement of the indirect communication is an urgent problem that needs to be solved.

Figure 2:
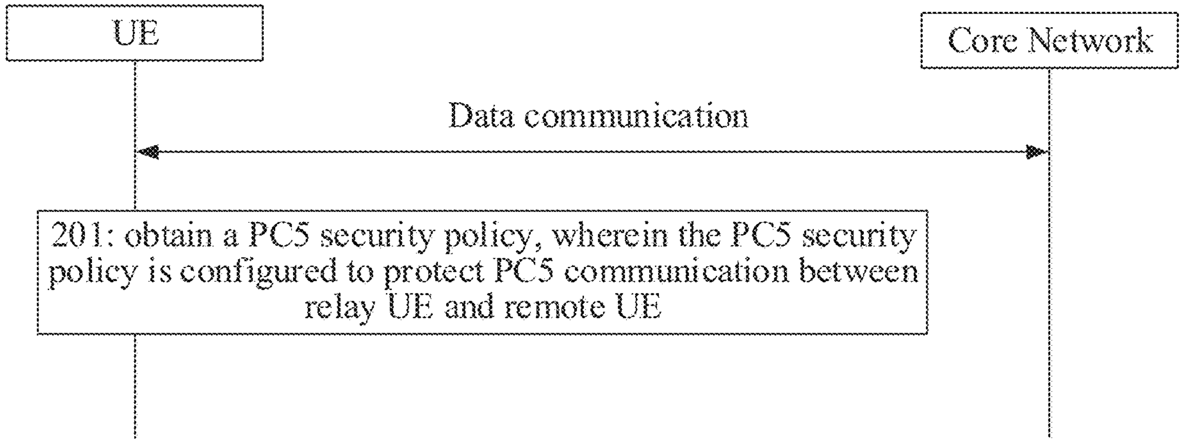
FIG. 2 is a flow chart of an information transmitting method according to an embodiment of the present disclosure.

As shown in FIG. 2, an embodiment of the present disclosure provides an information transmitting method that is performable by UE of a cellular mobile communication system. The information transmitting method includes: step 201, obtaining a PC5 security policy, in which the PC5 security policy is configured to protect PC5 communication between relay UE and remote UE.

The information transmitting method according to the embodiments can be executed by the UE in the cellular mobile communication, and the UE can include: a terminal (e.g., a mobile phone) that use the cellular mobile communication technology to conduct wireless communication.

In the ProSe indirect communication, the remote UE and the relay UE realize the PC5 communication by the established PC5 connection. The relay UE and a network side of the cellular mobile communication can realize communication through an air interface of the cellular mobile communication.

The PC5 security policy can be configured to configure the PC5 connection security of the PC5 communication realized through the PC5 connection in the ProSe indirect communication. Here, the PC5 connection security is a security protection way for the PC5 connection.

The PC5 security policy can indicate whether to apply the PC5 connection security to protect the PC5 communication.

In some embodiments, the PC5 security policy can indicate that: the PC5 connection security must be applied; the PC5 connection security is preferred; or the PC5 connection security is not needed.

The PC5 connection security can include various security protection ways. When the PC5 security policy indicates that the PC5 connection security is used to protect the PC5 communication, the PC5 security policy can also indicate a specific protection way used for the PC5 connection security.

The specific protection way of the PC5 connection security can include at least one of: an encryption protection for PC5 communication signaling and/or data; or an integrity protection for the PC5 communication signaling and/or data. The encryption protection for the PC5 communication signaling and/or data can be a security protection for the PC5 communication signaling and/or data by using key encryption and decryption. The integrity protection can be integrity protection and verification or the PC5 communication signaling and/or data using keys.

When the UE performs the PC5 communication in the ProSe indirect communication, the PC5 connection security of the PC5 communication can be determined based on the PC5 security policy, improving data communication security in the PC5 communication.

In this way, the PC5 connection security in the ProSe indirect communication is protected based on the security policy through the PC5 security policy, the remote UE and the relay UE, achieving the security protection for the PC5 communication in a ProSe relay service, meeting the security requirement of the ProSe indirect communication, and improving the communication security.

In an embodiment, the PC5 security policy is configured by the core network. The PC5 security policy can be configured by a policy control function (PCF) of the core network.

In an embodiment, obtaining the PC5 security policy includes: receiving indication information of the PC5 security policy sent by the core network.

Here, the PC5 security policy can be configured by the PCF of the core network. The indication information of the PC5 security policy can be sent by the PCF of the core network to the UE. The core network can send the indication information of the PC5 security policy to the UE through the air interface of the cellular mobile communication.

In an embodiment, the core network can send the indication information of the PC5 security policy to the UE through a NAS signaling during service authorization and activation of the UE. Here, the service authorization and activation can include: authorization and activation of the ProSe relay service. The core network can send the indication information of the PC5 security policy to the remote UE and the relay UE through the NAS signaling respectively during the service authorization and activation of the remote UE and during the service authorization and activation of the relay UE.

In some embodiments, the core network performs the service authorization and activation on the U2N relay UE, and the PCF provides the PC5 security policy of the ProSe indirect communication for the relay UE. The core network performs the service authorization and activation on the remote UE, and the PCF provides the PC5 security policy of the ProSe indirect communication for the remote UE.

In an embodiment, the indication information of the PC5 security policy is configured to indicate at least one ProSe relay service and the PC5 security policy corresponding to each of the at least one ProSe relay service.

In the ProSe indirect communication, the PC5 security policies for different ProSe relay services can be the same or different. In the same ProSe relay service, the PC5 connection security configured by the PC5 security policy aiming at a signaling plane and a data plane can be the same or different. For example, in the same ProSe relay service, the security configured by the PC5 security policy aiming at a PC5 UP and a PC5 CP can be different. Here, the ProSe relay service can be the service carried by the remote UE when it performs data relay through the relay UE and data communication with the network side.

Consequently, a security configuration can be achieved for the PC5 communication corresponding to one or more ProSe relay services by sending the indication information of the PC5 security policy through the core network, meeting the security requirement of the PC5 communication of each ProSe relay service, and improving the communication security.

In an embodiment, the ProSe relay service is indicated by a ProSe relay service code, and different ProSe relay services have different ProSe relay service codes.

The relay service code (RSC) can be provided by the PCF to the relay UE and the remote UE. One RSC can uniquely identify one ProSe relay service that the relay UE can provide for the remote UE. In addition, the RSC can also identify an authorized user, for whom the relay UE can provide the service, and can be configured to select relevant a security policy or information. For example, the RSC is required for the authentication and authorization between the remote UE and the relay UE.

In an embodiment, the PC5 security policy includes: a PC5 control plane (CP) security policy configured to protect PC5 communication of a CP between the relay UE and the remote UE; and/or a PC5 user plane (UP) security policy configured to protect PC5 communication of a UP between the relay UE and the remote UE.

The security requirements of the CP and the UP during data transmission can be the same or different. The PC5 CP security policy can be configured to configure the PC5 communication security of the CP between the relay UE and the remote UE, i.e., PC5 CP security. The PC5 UP security policy can be configured to configure the PC5 communication security of the UP between the relay UE and the remote UE, i.e., PC5 UP security.

In an embodiment, the PC5 CP security policy meets a security requirement of a non-access stratum (NAS) signaling and of an access stratum (AS) signaling.

For the ProSe indirect communication achieved through the relay UE, it is required to establish the PC5 communication to carry a signaling and user data between the remote UE and the relay UE. When the remote UE requests the ProSe indirect communication from the network side, the PC5 CP security policy needs to meet the security requirement of the PC5 communication of the ProSe relay service running between the remote UE and the relay UE, and the PC5 CP security policy also needs to meet the security requirement of the NAS signaling and the AS signaling from the network side.

Consequently, the PC5 CP security of the ProSe indirect communication configured by the PC5 CP security policy needs to keep consistent with the security requirement of the NAS signaling and the AS signaling.

For example, the PC5 CP security policy of the ProSe indirect communication can configure the PC5 CP security to keep consistent with the security requirement of the NAS signaling and the AS signaling defined in 3GPP TS 33.501, i.e., the PC5 CP security of the ProSe indirect communication is REQUIRED.

In an embodiment, the PC5 UP security policy is determined based on a UP security requirement of the ProSe relay service.

When the remote UE requests the ProSe indirect communication from the network side, the PC5 UP security policy needs to meet ProSe service data exchanged between the remote UE and the relay UE. The PC5 UP security policy also needs to meet a connection service provided by the relay UE requested by the remote UE. Furthermore, the connection service provided by the relay UE is configured to support the relay service provided by the network side for the remote UE through the relay UE. Consequently, the PC5 UP security requirement configured by the PC5 UP security policy needs to meet the UP security requirement of the relay service provided by the network.

In some embodiments, the PC5 UP security policy can configure the PC5 UP security to keep consistent with network side UP security. Protection requirements for encryption and integrity in the network side UP security can have options of "REQUIRED", "PREFERRED", or "NOT NEEDED".

In an embodiment, the information transmitting method further includes: establishing the PC5 communication based on the PC5 security policy.

When establishing the ProSe indirect communication, the remote UE can discover the relay UE and determine the ProSe relay service that the relay UE can provide.

The remote UE selects the discovered relay UE and establishes the PC5 connection to perform the ProSe indirect communication. The PC5 connection security of the PC5 communication between the remote UE and the relay UE is configured by the PC5 security policy. In an embodiment, the PC5 security policy is sent by the PCF to the remote UE and the relay UE.

In an embodiment, when the UE is the relay UE, the information transmitting method further includes: protecting a protocol data unit (PDU) session corresponding to the ProSe relay service based on a UP security policy provided by the network side.

The relay UE can establish the PDU session of the ProSe indirect communication. The UP security policy of the established PDU session can be provided by the network. Here, the PDU session can be established before the remote UE requests to establish the PC5 communication of the ProSe indirect communication.

The relay UE and a 5G wireless access network (NG-RAN) can activate the UP security of the PDU session based on the UP security policy.

The remote UE can request different ProSe relay services from the relay UE. The remote UE can make a request by sending a relay service code (RSC) of the ProSe relay service to the relay UE. If the relay UE has not yet established a PDU session associated with the RSC, or if the relay UE actively needs to establish a new PDU session for relay, the relay UE can initiate a new PDU session establishment process before establishing the PC5 connection. The UP security policy of the new PDU session can also be provided by the network side. Here, the network side can be the wireless access network and/or the core network in the cellular mobile communication system.

In an embodiment, after the establishment of the ProSe indirect communication, the PC5 connection security of the PC5 communication between the remote UE and the relay UE can be determined based on the configuration of the PC5 security policy. The communication security between the relay UE and the network side can be determined based on the configuration of the security policy provided by the network side. Consequently, the PC5 communication security in the ProSe indirect communication and the communication security between the relay UE and the network side can be achieved.

Figure 3:
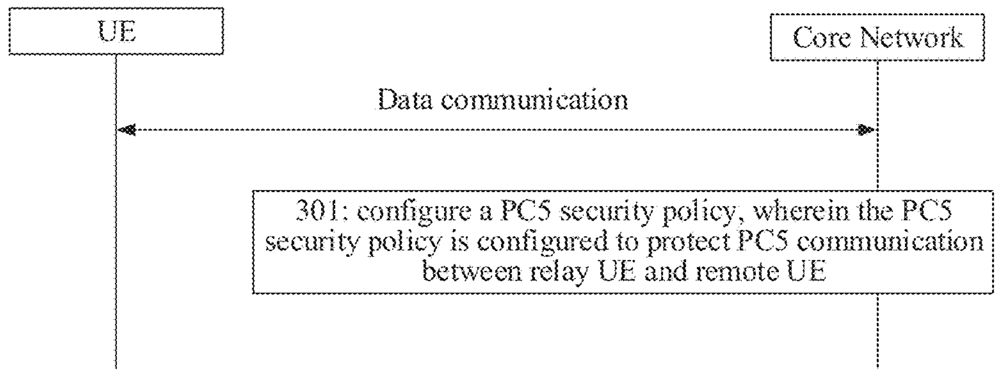
FIG. 3 is a flow chart of another information transmitting method according to an embodiment of the present disclosure.

As shown in FIG. 3, an embodiment of the present disclosure provides an information transmitting method that is performable by a core network of a cellular mobile communication system. The information transmitting method includes: step 301, configuring a PC5 security policy, in which the PC5 security policy is configured to protect PC5 communication between relay UE and remote UE.

The information transmitting method according to the embodiments can be executed by a PCF in the core network. The PC5 security policy can be configured by the PCF.

In the ProSe indirect communication, the remote UE and the relay UE realize the PC5 communication by the established PC5 connection. The relay UE and a network side of the cellular mobile communication can realize communication through an air interface of the cellular mobile communication.

The PC5 security policy can be configured to configure the PC5 connection security of the PC5 communication realized through the PC5 connection in the ProSe indirect communication. Here, the PC5 connection security is a security protection way for the PC5 connection.

The PC5 security policy can indicate whether to apply the PC5 connection security to protect the PC5 communication.

In some embodiments, the PC5 security policy can indicate that: the PC5 connection security must be applied; the PC5 connection security is preferred; or the PC5 connection security is not needed.

The PC5 connection security can include various security protection ways. When the PC5 security policy indicates that the PC5 connection security is used to protect the PC5 communication, the PC5 security policy can also indicate a specific protection way used for the PC5 connection security.

The specific protection way of the PC5 connection security can include at least one of: an encryption protection for PC5 communication signaling and/or data; or an integrity protection for the PC5 communication signaling and/or data. The encryption protection for the PC5 communication signaling and/or data can be a security protection for the PC5 communication signaling and/or data by using key encryption and decryption. The integrity protection can be integrity protection and verification or the PC5 communication signaling and/or data using keys.

When the UE performs the PC5 communication in the ProSe indirect communication, the PC5 connection security of the PC5 communication can be determined based on the PC5 security policy, improving data communication security in the PC5 communication.

In this way, the PC5 connection security in the ProSe indirect communication is protected based on the security policy through the PC5 security policy, the remote UE and the relay UE, achieving the security protection for the PC5 communication in a ProSe relay service, meeting the security requirement of the ProSe indirect communication, and improving the communication security.

In an embodiment, the PC5 security policy includes: a PC5 control plane (CP) security policy configured to protect PC5 communication of a CP between the relay UE and the remote UE; and/or a PC5 user plane (UP) security policy configured to protect PC5 communication of a UP between the relay UE and the remote UE.

The security requirements of the CP and the UP during data transmission can be the same or different. The PC5 CP security policy can be configured to configure the PC5 communication security of the CP between the relay UE and the remote UE, i.e., PC5 CP security. The PC5 UP security policy can be configured to configure the PC5 communication security of the UP between the relay UE and the remote UE, i.e., PC5 UP security.

In an embodiment, the PC5 CP security policy meets a security requirement of a non-access stratum (NAS) signaling and of an access stratum (AS) signaling.

For the ProSe indirect communication achieved through the relay UE, it is required to establish the PC5 communication to carry a signaling and user data between the remote UE and the relay UE. When the remote UE requests the ProSe indirect communication from the network side, the PC5 CP security policy needs to meet the security requirement of the PC5 communication of the ProSe relay service running between the remote UE and the relay UE, and the PC5 CP security policy also needs to meet the security requirement of the NAS signaling and the AS signaling from the network side.

Consequently, the PC5 CP security of the ProSe indirect communication configured by the PC5 CP security policy needs to keep consistent with the security requirement of the NAS signaling and the AS signaling.

For example, the PC5 CP security policy of the ProSe indirect communication can configure the PC5 CP security to keep consistent with the security requirement of the NAS signaling and the AS signaling defined in 3GPP TS 33.501, i.e., the PC5 CP security of the ProSe indirect communication is REQUIRED.

In an embodiment, the PC5 UP security policy is determined based on a UP security requirement of the ProSe relay service.

When the remote UE requests the ProSe indirect communication from the network side, the PC5 UP security policy needs to meet ProSe service data exchanged between the remote UE and the relay UE. The PC5 UP security policy also needs to meet a connection service provided by the relay UE requested by the remote UE. Furthermore, the connection service provided by the relay UE is configured to support the relay service provided by the network side for the remote UE through the relay UE. Consequently, the PC5 UP security requirement configured by the PC5 UP security policy needs to meet the UP security requirement of the relay service provided by the network.

In some embodiments, the PC5 UP security policy can configure the PC5 UP security to keep consistent with network side UP security. Protection requirements for encryption and integrity in the network side UP security can have options of "REQUIRED", "PREFERRED", or "NOT NEEDED".

In an embodiment, the information transmitting method further includes: sending indication information of the PC5 security policy to the UE.

Here, the PC5 security policy can be configured by the PCF of the core network. The indication information of the PC5 security policy can be sent by the PCF of the core network to the UE. The core network can send the indication information of the PC5 security policy to the UE through the air interface of the cellular mobile communication.

In an embodiment, the core network can send the indication information of the PC5 security policy to the UE through a NAS signaling during service authorization and activation of the UE. Here, the service authorization and activation can include: authorization and activation of the ProSe relay service. The core network can send the indication information of the PC5 security policy to the remote UE and the relay UE through the NAS signaling respectively during the service authorization and activation of the remote UE and during the service authorization and activation of the relay UE.

In some embodiments, the core network performs the service authorization and activation on the U2N relay UE, and the PCF provides the PC5 security policy of the ProSe indirect communication for the relay UE. The core network performs the service authorization and activation on the remote UE, and the PCF provides the PC5 security policy of the ProSe indirect communication for the remote UE.

In an embodiment, the indication information of the PC5 security policy is configured to indicate at least one ProSe relay service and the PC5 security policy corresponding to each of the at least one ProSe relay service.

In the ProSe indirect communication, the PC5 security policies for different ProSe relay services can be the same or different. In the same ProSe relay service, the PC5 connection security configured by the PC5 security policy aiming at a signaling plane and a data plane can be the same or different. For example, in the same ProSe relay service, the security configured by the PC5 security policy aiming at a PC5 UP and a PC5 CP can be different. Here, the ProSe relay service can be the service carried by the remote UE when it performs data relay through the relay UE and data communication with the network side.

Consequently, a security configuration can be achieved for the PC5 communication corresponding to one or more ProSe relay services by sending the indication information of the PC5 security policy through the core network, meeting the security requirement of the PC5 communication of each ProSe relay service, and improving the communication security.

In an embodiment, the ProSe relay service is indicated by a ProSe relay service code, and different ProSe relay services have different ProSe relay service codes.

The relay service code (RSC) can be provided by the PCF to the relay UE and the remote UE. One RSC can uniquely identify one ProSe relay service that the relay UE can provide for the remote UE. In addition, the RSC can also identify an authorized user, for whom the relay UE can provide the service, and can be configured to select relevant a security policy or information. For example, the RSC is required for the authentication and authorization between the remote UE and the relay UE.

A specific example is provided below in conjunction with any of the above embodiments.

Figure 4:
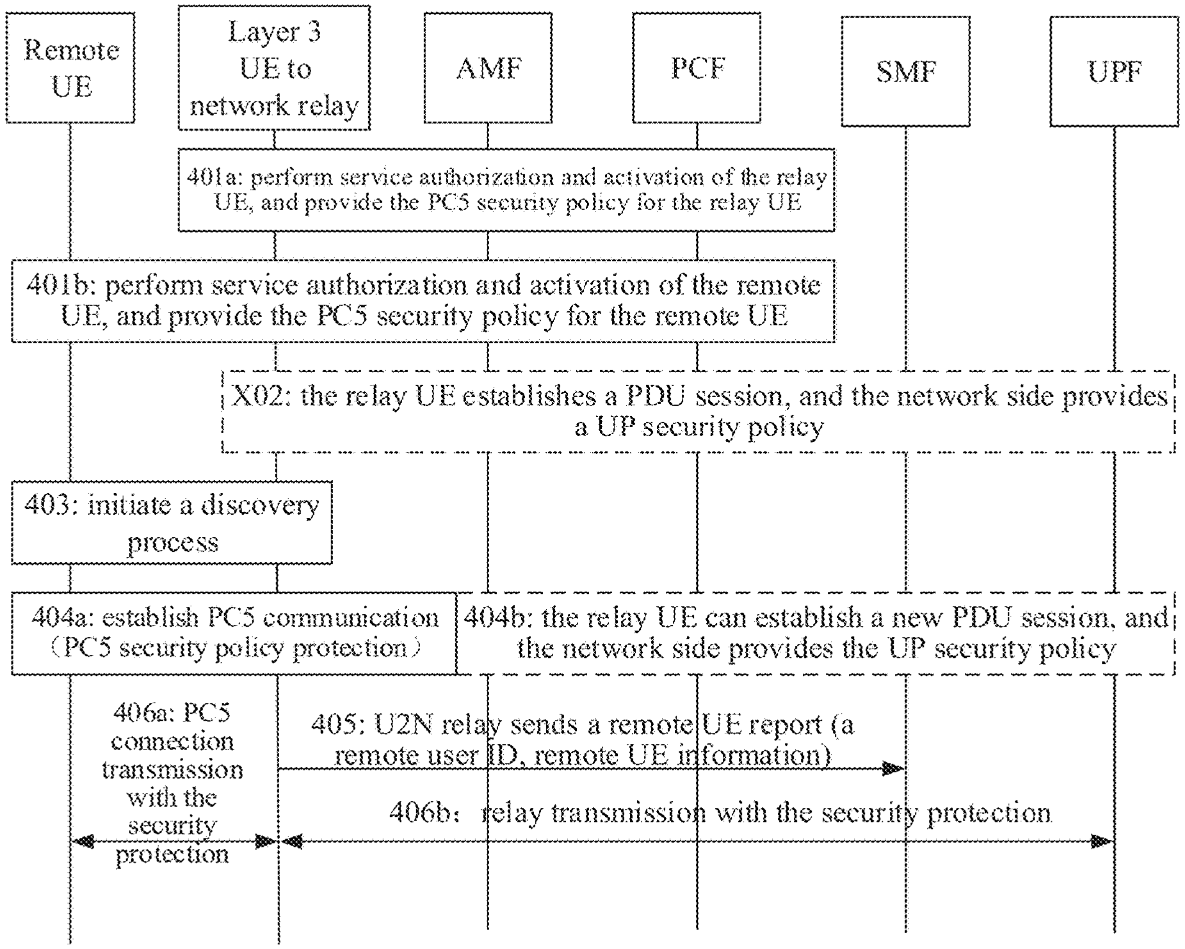
FIG. 4 is a schematic diagram of information interaction in an information transmitting method according to an embodiment of the present disclosure.

As shown in FIG. 4, application of the PC5 security policy during the ProSe indirect communication include following steps.

Step 401*a*: the core network provides the PC5 security policy for the relay UE during service authorization and activation of the relay UE.

Step 401*b*: the core network provides the PC5 security policy for the remote UE during service authorization and activation of the remote UE.

Step 402: optionally, the relay UE establishes a PDU session for the ProSe indirect communication relay, in which a UP security policy of the established PDU session is provided by the network side.

Step 403: the remote UE initiates a discovery process, and the remote UE discovers the relay UE and determines a ProSe relay service provided by the relay UE.

Step 404*a*: the remote UE selects the discovered relay UE and establishes a PC5 connection to perform the ProSe indirect communication. The security of the PC5 connection of the PC5 communication between the remote UE and the relay UE is configured by the PC5 security policy.

Step 404*b*: optionally, if the relay UE has not yet established the PDU session associated with RSC, or if the relay UE actively needs to establish a new PDU session for relay, the relay UE initiates a new PDU session establishment process before establishing the PC5 connection. The UP security policy for the new PDU session can also be provided by the network side.

Step 405: the relay UE sends a remote UE report (a remote user ID, remote UE information) to a SMF (session management function), in which the remote UE report is sent for the PDU session.

Step 406*a*: ProSe relay service traffic is transmitted through the PC5 connection with the security protection.

Step 406*b*: a connection transmission between the relay UE of the ProSe relay service traffic and the network side has the security protection.

Figure 5:
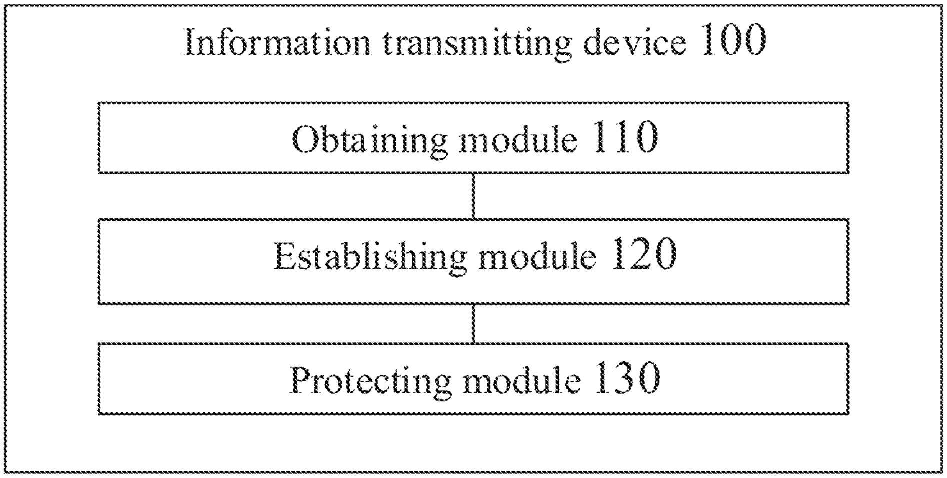
FIG. 5 is a block diagram of an information transmitting device according to an embodiment of the present disclosure.

Embodiments of the present disclosure also provide an information transmitting device, performable by UE of the cellular mobile wireless communication. As shown in FIG. 5, the information transmitting device 100 includes: an obtaining module 110 configured to obtain a PC5 security policy, in which the PC5 security policy is configured to protect PC5 communication between relay UE and remote UE.

In an embodiment, the PC5 security policy includes: a PC5 control plane (CP) security policy configured to protect PC5 communication of a CP between the relay UE and the remote UE; and/or a PC5 user plane (UP) security policy configured to protect PC5 communication of a UP between the relay UE and the remote UE.

In an embodiment, the PC5 CP security policy meets a security requirement of a non-access stratum (NAS) signaling and of an access stratum (AS) signaling.

In an embodiment, the PC5 UP security policy is determined based on a UP security requirement of a proximity service (ProSe) relay service.

In an embodiment, the information transmitting device further includes: an establishing module 120 configured to establish the PC5 communication based on the PC5 security policy.

In an embodiment, when the UE is the relay UE, the information transmitting device further includes: a protecting module 130 configured to protect a protocol data unit (PDU) session corresponding to a ProSe relay service based on a UP security policy provided by a network side.

In an embodiment, the obtaining module 110 is specifically configured to receive indication information of the PC5 security policy sent by a core network.

In an embodiment, the indication information of the PC5 security policy is configured to indicate at least one ProSe relay service and the PC5 security policy corresponding to each of the at least one ProSe relay service.

In an embodiment, the ProSe relay service is indicated by a ProSe relay service code, and different ProSe relay services have different ProSe relay service codes.

Figure 6:
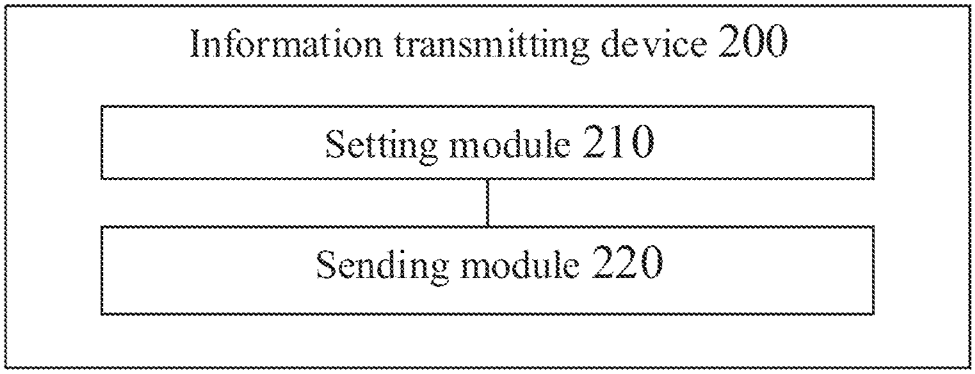
FIG. 6 is a block diagram of another information transmitting device according to an embodiment of the present disclosure.

Embodiments of the present disclosure provide an information transmitting device, performable by a core network of the cellular mobile wireless communication. As shown in FIG. 6, the information transmitting device 200 includes: a setting module 210 configured to configure a PC5 security policy, in which the PC5 security policy is configured to protect PC5 communication between relay UE and remote UE.

In an embodiment, the PC5 security policy includes: a PC5 control plane (CP) security policy configured to protect PC5 communication of a CP between the relay UE and the remote UE; and/or a PC5 user plane (UP) security policy configured to protect PC5 communication of a UP between the relay UE and the remote UE.

In an embodiment, the PC5 CP security policy meets a security requirement of a non-access stratum (NAS) signaling and of an access stratum (AS) signaling.

In an embodiment, the PC5 UP security policy is determined based on a UP security requirement of a proximity service (ProSe) relay service.

In an embodiment, the device further includes: a sending module 220 configured to send indication information of the PC5 security policy to the UE.

In an embodiment, the indication information of the PC5 security policy is configured to indicate at least one ProSe relay service and the PC5 security policy corresponding to each of the at least one ProSe relay service.

In an embodiment, the ProSe relay service is indicated by a ProSe relay service code, and different ProSe relay services have different ProSe relay service codes.

In some embodiments, the obtaining module 110, the establishing module 120, the protecting module 130, the setting module 210, and the sending module 220 can be achieved by one or more central processing units (CPU), graphics processing units (GPU), baseband processors (BP), application specific integrated circuits (ASIC), DSP, programmable logic devices (PLD), complex programmable logic devices (CPLD), and field-programmable gate arrays (FPGA), general-purpose processors, controllers, micro controller units (MCU), microprocessors, or other electronic elements, which are configured to execute the information transmitting method.

Figure 7:
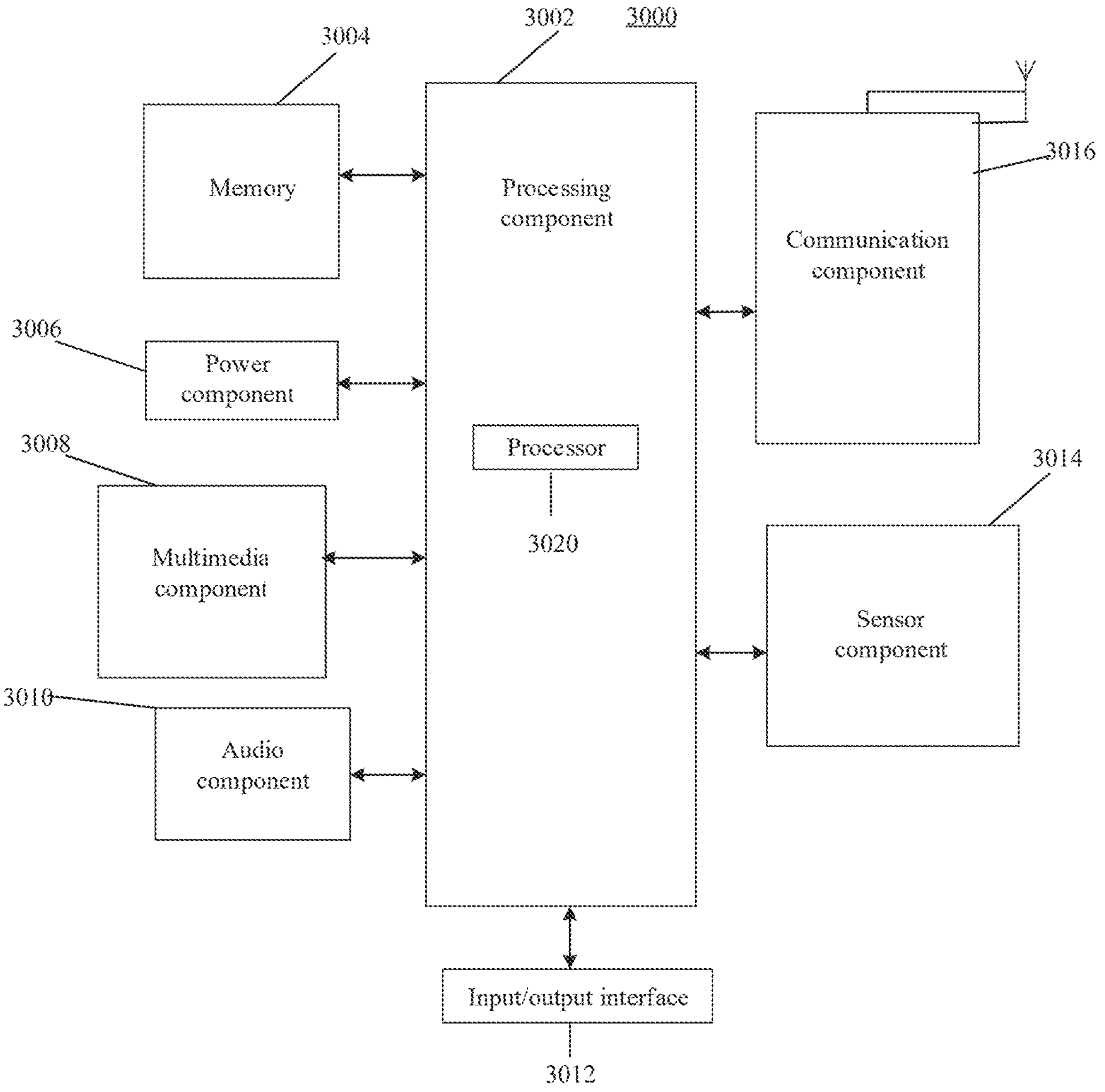
FIG. 7 is a block diagram of a device for information transmission according to an embodiment of the present disclosure.

FIG. 7 is a block diagram of a device 3000 for information transmission according to an embodiment of the present disclosure. For example, the device 3000 can be a mobile phone, a computer, a digital broadcasting terminal, a message receiving and sending apparatus, a game console, a tablet apparatus, a medical apparatus, a fitness apparatus, a personal digital assistant, etc.

Referring to FIG. 7, the device 3000 can include one or more of following components: a processing component 3002, a memory 3004, a power component 3006, a multimedia component 3008, an audio component 3010, an input/output (I/O) interface 3012, a sensor component 3014 and a communication component 3016.

The processing component 3002 typically controls the overall operation of the device 3000, such as operations associated with display, telephone calls, data communication, camera operations, and recording operations. The processing component 3002 can include one or more processors 3020 to execute instructions to complete all or part of the steps of the above methods. In addition, the processing component 3002 can include one or more modules to facilitate the interaction between the processing component 3002 and other components. For example, the processing component 3002 can include a multimedia module to facilitate interaction between the multimedia component 3008 and the processing component 3002.

The memory 3004 is configured to store various types of data to support operations on the device 3000. Examples of these data include instructions for any application program or method operated on the device 3000, contact data, phone book data, messages, images, videos, etc. The memory 3004 can be implemented by any type of volatile or non-volatile storage apparatus or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

The power component 3006 provides power to various components of the device 3000. The power component 3006 can include a power management system, at least one power supply, and other components associated with generating, managing, and distributing power for the device 3000.

The multimedia component 3008 includes a screen providing an output interface between the device 3000 and a user. In some embodiments, the screen can include a liquid crystal display (LCD) and a touch panel (TP). If the screen includes the touch panel, the screen can be implemented as a touch screen to receive input signals from the user. The touch panel includes at least one touch sensor to sense touches, slides and gestures on the touch panel. The touch sensor can not only sense the boundaries of the touch or slide action, but also detect the wake-up time and pressure associated with the touch or slide operation. In some embodiments, the multimedia component 3008 includes a front camera and/or a rear camera. The front camera and/or the rear camera can receive external multimedia data when the device 3000 is in an operating mode, such as a shooting mode or a video mode. Each front camera and rear camera can be a fixed optical lens system or have a focal length and an optical zoom capability.

The audio component 3010 is configured to output and/or input audio signals. For example, the audio component 3010 includes a microphone (MIC) that is configured to receive external audio signals when the device 3000 is in the operating mode, such as a call mode, a recording mode, and a speech recognition mode. The received audio signals can be further stored in the memory 3004 or transmitted through the communication component 3016. In some embodiments, the audio component 3010 further includes a speaker for outputting the audio signals.

The input/output (I/O) interface 3012 provides an interface between the processing component 3002 and a peripheral interface module, the peripheral interface module can be a keypad, a click wheel, a button, and the like. These buttons can include, but are not limited to, a home button, a volume button, a start button, and a lock button.

The sensor component 3014 includes at least one sensor for providing state assessments of various aspects for the device 3000. For example, the sensor component 3014 can detect the on/off state of the device 3000, the relative positioning of components, such as a display and a keypad of the device 3000. The sensor component 3014 can also detect the position change of the device 3000 or a component of the device 3000, the presence or absence of user contact with the device 3000, the orientation or acceleration/deceleration of the device 3000 and the temperature change of the device 3000. The sensor component 3014 can include a proximity sensor configured to detect the presence of a nearby object without any physical contact. The sensor component 3014 can also include an optical sensor, such as a CMOS or CCD image sensor, for use in imaging applications. In some embodiments, the sensor component 3014 can also include an acceleration sensor, a gyroscope sensor, a magnetic sensor, a pressure sensor, or a temperature sensor.

The communication component 3016 is configured to facilitate wired or wireless communication between the device 3000 and other apparatuses. The device 3000 can access to a wireless network based on a communication standard, such as Wi-Fi, 2G or 3G, or a combination thereof. In an embodiment, the communication component 3016 receives broadcast signals or broadcast-related information from an external broadcast management system via a broadcast channel. In an embodiment, the communication component 3016 further includes a near field communication (NFC) module to facilitate short range communication. For example, NFC modules can be implemented based on Radio Frequency Identification (RFID) technology, Infrared Data Association (IrDA) technology, Ultra-Wide Band (UWB) technology, Bluetooth (BT) technology and other technologies.

In some embodiments, the device 3000 can be implemented by at least one application specific integrated circuit (ASIC), digital signal processor (DSP), digital signal processing device (DSPD), programmable logic device (PLD), field programmable gate array (FPGA), controller, microcontroller, microprocessor, or another electronic element, for executing the above methods.

In some embodiments, there is also provided a non-transitory computer-readable storage medium including instructions, such as the memory 3004 including instructions, the instructions can be executed by the processor 3020 of the device 3000 to complete the above methods. For example, the non-transitory computer-readable storage medium can be a ROM, a random access memory (RAM), a CD-ROM, a magnetic tape, a floppy disk, and an optical data storage apparatus, etc.

Other embodiments of the present disclosure will easily occur to those skilled in the art after considering the specification and practicing the present disclosure disclosed herein. This application is intended to cover any variations, uses or adaptations of the present disclosure, which follow the general principles of the present disclosure and include common sense or common technical means in this technical field that are not disclosed in the present disclosure. The specification and embodiments are only considered illustrative, and the true scope of the present disclosure are indicated by the claims.

It should be understood that the present disclosure is not limited to the precise structures described above and shown in the drawings, and various modifications and changes can be made without departing from its scope. The scope of the present disclosure is limited only by the scope of the appended claims.

What is claimed is:

1. An information transmitting method, performable by user equipment (UE), and comprising:

obtaining a PC5 security policy, wherein the PC5 security policy is configured to protect PC5 communication between relay UE and remote UE, wherein the PC5 security policy comprises at least one of:

a PC5 control plane (CP) security policy configured to protect PC5 communication of a CP between the relay UE and the remote UE; or a PC5 user plane (UP) security policy configured to protect PC5 communication of a UP between the relay UE and the remote UE, wherein the PC5 CP security policy meets a security requirement of a non-access stratum (NAS) signaling and of an access stratum (AS) signaling, wherein obtaining the PC5 security policy comprises:

receiving indication information of the PC5 security policy sent by a PCF of a core network, wherein the indication information of the PC5 security policy indicates a proximity service (ProSe) relay service code, and the ProSe relay service code indicates a ProSe relay service.

2. The information transmitting method according to claim 1, wherein the PC5 UP security policy is determined based on a UP security requirement of the (ProSe) relay service.

3. The information transmitting method according to claim 1, further comprising:

establishing the PC5 communication based on the PC5 security policy.

4. The information transmitting method according to claim 1, wherein when the UE is the relay UE, the information transmitting method further comprises:

protecting a protocol data unit (PDU) session corresponding to the ProSe relay service based on a UP security policy provided by a network side.

5. The information transmitting method according to claim 1, wherein the indication information of the PC5 security policy is configured to indicate at least one ProSe relay service and the PC5 security policy corresponding to each of the at least one ProSe relay service.

6. The information transmitting method according to claim 5, wherein different ProSe relay services have different ProSe relay service codes.

7. A non-transitory storage medium having stored therein an executable instruction, that, when executed by a processor, implements the information transmitting method according to claim 1.

8. An information transmitting method, performable by a PCF of a core network, and comprising:
configuring a PC5 security policy, wherein the PC5 security policy is configured to protect PC5 communication between relay UE and remote UE,
wherein the PC5 security policy comprises at least one of:
a PC5 control plane (CP) security policy configured to protect PC5 communication of a CP between the relay UE and the remote UE; or
a PC5 user plane (UP) security policy configured to protect PC5 communication of a UP between the relay UE and the remote UE,
wherein the PC5 CP security policy meets a security requirement of a non-access stratum (NAS) signaling and of an access stratum (AS) signaling,
wherein the information transmitting method further comprises:
sending indication information of the PC5 security policy to the UE,
wherein the indication information of the PC5 security policy indicates a proximity service (ProSe) relay service code, and the ProSe relay service code indicates a ProSe relay service.

9. The information transmitting method according to claim 8, wherein the PC5 UP security policy is determined based on a UP security requirement of the ProSe relay service.

10. The information transmitting method according to claim 8, wherein the indication information of the PC5 security policy is configured to indicate at least one ProSe relay service and the PC5 security policy corresponding to each of the at least one ProSe relay service.

11. The information transmitting method according to claim 10, wherein different ProSe relay services have different ProSe relay service codes.

12. A communication apparatus, comprising a processor, a memory, and an executable program that is stored in the memory and runnable by the processor, wherein when running the executable program, the processor executes the information transmitting method according to claim 8.

13. A non-transitory storage medium having stored therein an executable instruction, that, when executed by a processor, implements the information transmitting method according to claim 8.

14. A communication apparatus, comprising a processor, a memory, and an executable program that is stored in the memory and runnable by the processor, wherein when running the executable program, the processor obtains a PC5 security policy that is configured to protect PC5 communication between relay UE and remote UE,
wherein the PC5 security policy comprises at least one of:
a PC5 control plane (CP) security policy configured to protect PC5 communication of a CP between the relay UE and the remote UE; or
a PC5 user plane (UP) security policy configured to protect PC5 communication of a UP between the relay UE and the remote UE,
wherein the PC5 CP security policy meets a security requirement of a non-access stratum (NAS) signaling and of an access stratum (AS) signaling,
wherein the processor is configured to:
receive indication information of the PC5 security policy sent by a PCF of a core network,
wherein the indication information of the PC5 security policy indicates a proximity service (ProSe) relay service code, and the ProSe relay service code indicates a ProSe relay service.

* * * * *